US011635748B2

(12) United States Patent
Gade et al.

(10) Patent No.: US 11,635,748 B2
(45) Date of Patent: Apr. 25, 2023

(54) ANALYSIS OF EVENT BASED BEHAVIOR OF END-POINTS IN AN INDUSTRIAL SYSTEM

(71) Applicant: ABB Schweiz AG, Baden (CH)

(72) Inventors: Jörgen Gade, Västerås (SE); Johan Åkerberg, Västerås (SE); Ewa Hansen, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/292,089

(22) PCT Filed: Nov. 19, 2018

(86) PCT No.: PCT/EP2018/081773
§ 371 (c)(1),
(2) Date: May 7, 2021

(87) PCT Pub. No.: WO2020/104007
PCT Pub. Date: May 28, 2020

(65) Prior Publication Data
US 2021/0405623 A1    Dec. 30, 2021

(51) Int. Cl.
*G05B 19/418* (2006.01)
*H04L 67/125* (2022.01)
*H04L 67/00* (2022.01)

(52) U.S. Cl.
CPC ..... *G05B 19/4185* (2013.01); *G05B 19/4183* (2013.01); *H04L 67/125* (2013.01); *H04L 67/34* (2013.01)

(58) Field of Classification Search
CPC ........................ G05B 19/4185; H04L 67/125
(Continued)

(56) References Cited

U.S. PATENT DOCUMENTS 8,555,385 B1 * 10/2013 Bhatkar ................ G06F 21/556
726/25
8,560,889 B2 * 10/2013 Behrendt .............. G06F 11/203
714/26
(Continued)

FOREIGN PATENT DOCUMENTS

EP       3293919 A1    3/2018
WO    2009011966 A1    1/2009
WO    2016004981 A1    1/2016

OTHER PUBLICATIONS

Gorecky, Dominic, et al. "Human-machine-interaction in the industry 4.0 era." 2014 12th IEEE international conference on industrial informatics (INDIN), Ieee, 2014.pp.289-294 (Year: 2014).*

(Continued)

*Primary Examiner* — Satish Rampuria
(74) *Attorney, Agent, or Firm* — Whitmyer IP Group LLC

(57) ABSTRACT

A mechanisms for analyzing event based behavior of end-points of a network in an industrial system and a method performed by a control node, the method includes collecting, from the end-points, timestamped event log entries as created by the end-points within a time window. Each respective timestamped event log entry pertains to a respective event performed by one of the end-points. The method includes identifying tuples of correlated events by comparing the timestamped event log entries to each other, thereby providing a mapping between the events and those end-points where the events of each tuple of correlated events are performed.

14 Claims, 5 Drawing Sheets

(58) Field of Classification Search
USPC .................................................... 700/11–55
See application file for complete search history.

(56) References Cited

U.S. PATENT DOCUMENTS

| | | | | |
|---|---|---|---|---|
| 8,997,057 | B1* | 3/2015 | Diwan | G06F 11/3409 |
| | | | | 717/124 |
| 9,929,923 | B2 | 3/2018 | Heinz et al. | |
| 2005/0198034 | A1* | 9/2005 | Boyer | G05B 19/4185 |
| 2015/0304185 | A1 | 10/2015 | Frost et al. | |
| 2016/0080419 | A1* | 3/2016 | Schiappa | H04L 63/1441 |
| | | | | 726/1 |
| 2017/0149626 | A1* | 5/2017 | Yoon | H04W 24/10 |
| 2018/0075106 | A1* | 3/2018 | Haver | G06F 16/24568 |
| 2018/0102943 | A1* | 4/2018 | Movsisyan | H04L 41/069 |

OTHER PUBLICATIONS

Vogel-Heuser, Birgit, et al. "Evolution of software in automated production systems: Challenges and research directions." Journal of Systems and Software 110 (2015): pp. 54-84. (Year: 2015).*

Yang, Nan, et al. "An interview study of how developers use execution logs in embedded software engineering." 2021 IEEE/ACM 43rd International Conference on Software Engineering: Software Engineering in Practice (ICSE-SEIP). IEEE, 2021.pp.61-70 (Year: 2021).*

Beschastnikh, Ivan, et al. "Inferring models of concurrent systems from logs of their behavior with CSight." Proceedings of the 36th International Conference on Software Engineering. 2014.pp.468-479 (Year: 2014).*

Meincheim, Alex, et al. "Combining process mining with trace clustering: manufacturing shop floor process—an applied case." 2017 IEEE 29th International Conference on Tools with Artificial Intelligence (ICTAI). IEEE, 2017.pp.498-505 (Year: 2017).*

Luo, Liang, et al. "Troubleshooting {Transiently-Recurring} Errors in Production Systems with {Blame-Proportional} Logging." 2018 USENIX Annual Technical Conference (USENIX ATC 18). 2018. pp.321-334 (Year: 2018).*

Gutierrez Marina, et al.; "Self-configuration of IEEE 802.1 TSN networks"; 2017 22nd IEEE International Conference on Emerging Technologies and Factory Automation (ETFA), Limassol, Cyprus Publisher: IEEE; Sep. 12, 2017; 8 Pages.

International Preliminary Report on Patentability; Application No. PCT/EP2018/081773; dated Feb. 11, 2021; 22 Pages.

International Search Report and Written Opinion of the International Searching Authority; Application No. PCT/EP2018/081773; Completed: Jul. 9, 2019; dated Jul. 16, 2019; 15 Pages.

* cited by examiner

ANALYSIS OF EVENT BASED BEHAVIOR OF END-POINTS IN AN INDUSTRIAL SYSTEM

TECHNICAL FIELD

Embodiments presented herein relate to a method, a control node, a computer program, and a computer program product for analyzing event based behavior of end-points of a network in an industrial system.

BACKGROUND

Time-Sensitive Networking (TSN) is an emerging standard aiming to enable Ethernet networks with real-time capabilities. TSN supports different traffic classes/priorities to coexist on the same network while guaranteeing deterministic end-to-end behavior. The mapping of the different traffic classes and priorities are done by assigning so-called VLAN tags (where VLAN is short for virtual local area network), see IEEE 802.1Q (often referred to as Dot1q) and MAC addresses (where MAC is short for media access control) to different priority queues/classes. According to an example, IEEE 802.1Q adds a 32-bit field between the source MAC address and the EtherType fields of the original frame. The 32-bit field includes Tag protocol identifier (TPID), Tag control information (TCI), Priority code point (PCP), Drop eligible indicator (DEI), and VLAN identifier (VID). TSN enables support for isochronous, hard and soft real-time, audio and video and best effort traffic, to mention just a few examples.

For instance, a TSN stream shaped with the IEEE 802.1Qbv Time Aware Shaper (TAS) mechanism does provide a mechanism for two or more end-points to share a certain amount of data on a regular basis with a maximum latency and low jitter. There can be hundreds or thousands of such TSN streams in a TSN network. TSN streams can use different shaping mechanisms (for instance according to IEEE 802.1Qbv, IEEE 802.1Qav, IEEE 802.1Qcr, IEEE 802.1Qch, etc.) and coexist simultaneously with each other and best effort traffic in the same network.

Events as created by end-points in networked systems, for example based on TSN, could be used to ensure reliable and deterministic communication. The so-called Tracealyzer from Percepio is an example of an existing mechanism that reveals what/when events do occur in non-networked embedded systems by analysis of timestamped logs. However, Tracealyzer can often be intrusive and is applicable only for embedded systems themselves, not networked embedded systems. Tracealyzer is thus not applicable for end-points communicating over a network.

Hence, there is a need for improved mechanisms for timewise keeping track of events in a network.

SUMMARY

An object of embodiments herein is to enable efficient tracking of events in an industrial system.

According to a first aspect there is presented a method for analyzing event based behavior of end-points of a network in an industrial system. The method is performed by a control node. The method comprises collecting, from the end-points, timestamped event log entries as created by the end-points within a time window. Each respective timestamped event log entry pertains to a respective event performed by one of the end-points. The method comprises identifying tuples of correlated events by comparing the timestamped event log entries to each other, thereby providing a mapping between the events and those end-points where the events of each tuple of correlated events are performed.

According to a second aspect there is presented a control node for analyzing event based behavior of end-points of a network in an industrial system. The control node comprises processing circuitry. The processing circuitry is configured to cause the control node to collect, from the end-points, timestamped event log entries as created by the end-points within a time window. Each respective timestamped event log entry pertains to a respective event performed by one of the end-points. The control node comprises processing circuitry. The processing circuitry is configured to cause the control node to identify tuples of correlated events by comparing the timestamped event log entries to each other, thereby providing a mapping between the events and those end-points where the events of each tuple of correlated events are performed.

According to a third aspect there is presented a computer program for analyzing event based behavior of end-points of a network in an industrial system, the computer program comprising computer program code which, when run on a control node, causes the control node to perform a method according to the first aspect.

According to a fourth aspect there is presented a computer program product comprising a computer program according to the third aspect and a computer readable storage medium on which the computer program is stored. The computer readable storage medium could be a non-transitory computer readable storage medium.

According to a fifth aspect there is presented an industrial system for analyzing event based behavior of end-points of a network in the industrial system. The industrial system comprises a control node according to the second aspect. The industrial system further comprises at least one of the end-points. This at least one of the end-points is configured to create at least one of the timestamped event log entries. This at least one of the end-points is further configured to provide the at least one of the timestamped event log entries to the control node.

Advantageously this provides efficient tracking of the events in the industrial system. Timing of events in different end-points of a networked industrial system may thus be compared and analysed.

Advantageously this enables detection of non-optimal network and end-point behavior and faster as well as easier correction thereof.

Advantageously this enables reduction of engineering work and faster and more efficient network management of networked control systems all the way to optionally autonomous end-point and switch reconfiguration actions.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
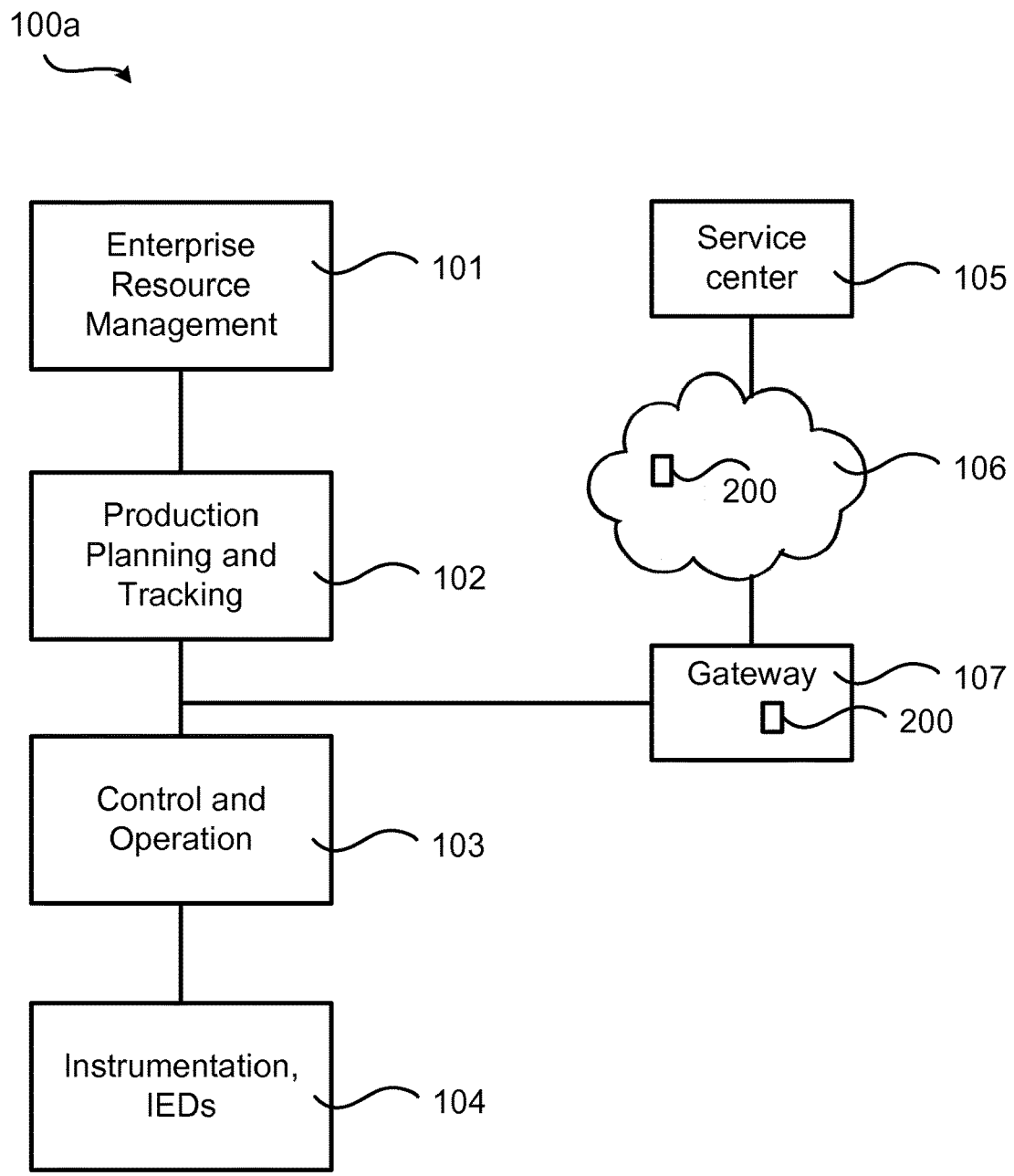
FIGS. 1 and 2 are schematic diagrams illustrating an industrial system according to embodiments.

FIG. 1 is a schematic diagram illustrating an industrial system 100a where embodiments presented herein can be applied. The industrial system 100a comprises an enterprise resource management part 101, a production planning and tracking part 102 (which might comprise a Plant Information Management System (PIMS), a Collaborative Production Management (CPM) system, etc.), a control and operation part 103 (which might comprise a Distributed Control System (DCS), a Supervisory Control And Data Acquisition (SCADA) system, etc.), an instrumentation and Intelligent Electronic Devices (IEDs) part 104 (which might comprise measurement instruments, sensors, actuators, local and remote input/output interfaces, machines, tools, robots, etc.), a service center 105, a cloud computational environment 106 and a gateway 107. One or more of the parts 101-104 comprises end-points. Examples of end-points will be given below. As will be further disclosed with reference to FIG. 2, the parts 101-104 in general, and the end-points in particular, are configured to communicate with each other (as well as with the service center 105) over a network. A control node 200 is provided in the gateway 107 and/or in the cloud computational environment 106.

Figure 2:
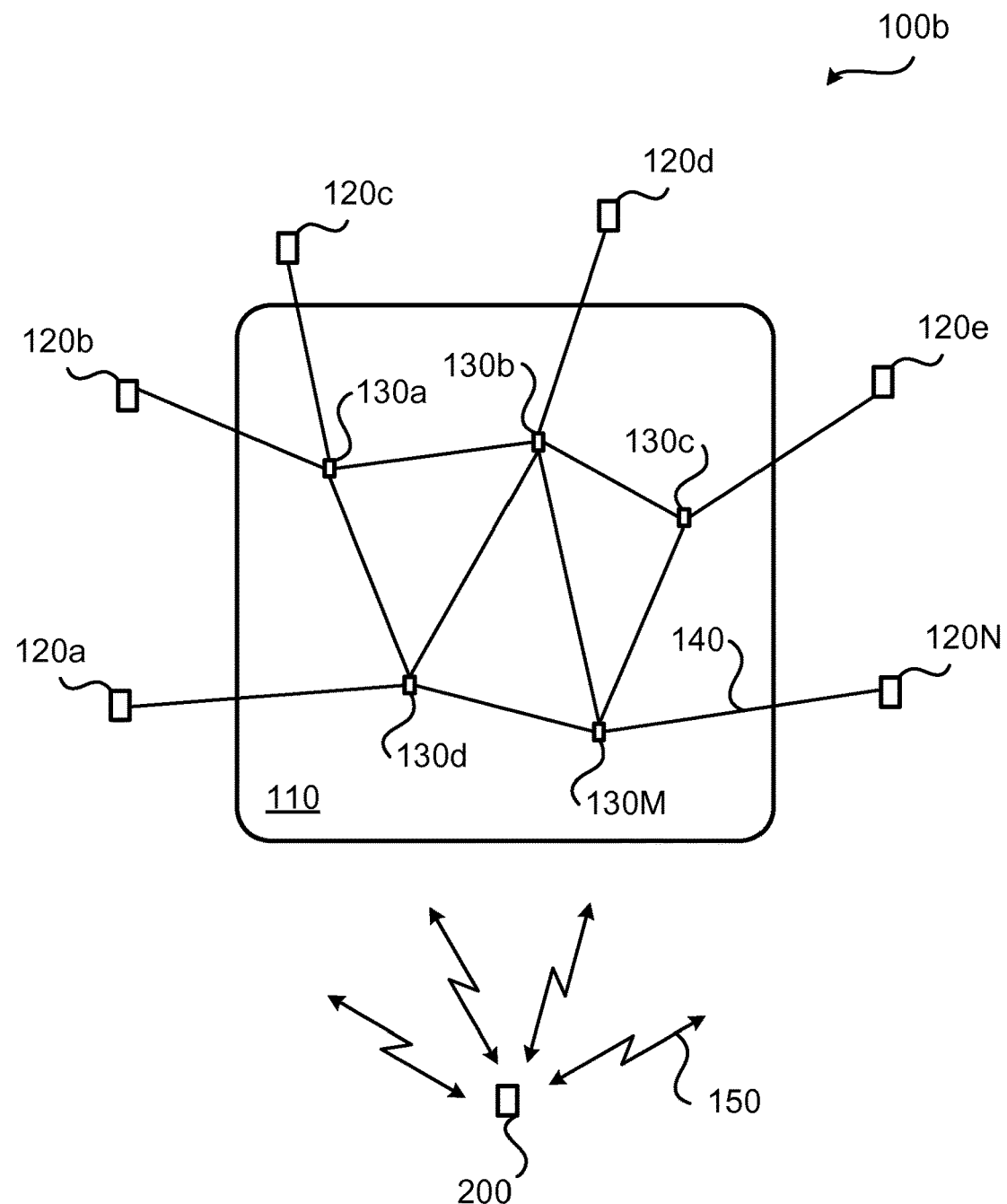

FIG. 2 is a schematic diagram illustrating an industrial system 100b where embodiments presented herein can be applied. FIG. 2 might be regarded as providing another perspective of the industrial system 100a of FIG. 1. In FIG. 2 the industrial system 100a of FIG. 1 is represented by its end-points and the network over which the end-points are configured to communicate. These end-points might be part of any of the parts 101-104 in FIG. 1 and the network might thus extend between two or more of the parts 101-104 in FIG. 1 as needed in order to enable the end-points to communicate with each other (as well as with the service center).

The industrial system 100b thus comprises end-points 120a, 120b, 120c, 120d, 120e, 120N and a network 110. There may be different examples of end-points 120a-120N. In some examples the end-points 120a-120N are industrial plant equipment. Non-limiting examples of industrial plant equipment are sensors, actuators, controllers, human machine interfaces (HMIs), engineering tools, cameras, and the like. The end-points 120a-120N might be required to operate, and communicate with each other, in real-time in order for the industrial system 110a, 100b to operate properly. Hence, the end-points 120a-120N might be referred to as real-time operating end-points 120a-120N. In some examples the end-points 120a-120N are part of a networked embedded system. Thus, in some examples the industrial system 100a, 100b is a networked embedded system. Further, the networked embedded system might be a distributed control system for controlling an industrial plant or process.

In turn, the network 110 comprises switches, routers, or gateways, 130a, 130b, 130c, 130d, 130M (herein simply referred to as switches). The switches 130a-130M are configured to route packets in the network 110 and thereby enable end-points 120a-120N to communicate with each other over communication links 140. The communication links 140 may be wired or wireless. Some of the communication links 140 might be wired whereas others of the communication links 140 might be wireless. In some embodiments the network 110 is a TSN network. In some examples at least some of the end-points 120a-120N are TSN-aware and thus configured, or otherwise enabled, for operation in a TSN network, although the general principles as disclosed herein are applicable also outside TSN networks. That the end-points 120a-120N are TSN-aware might be advantageous in case the end-points are real-time operating end-points 120a-120N.

As will be further disclosed below, each time an event is performed by one of the end-points 120a-120N, the end-point 120a-120N having performed the event also creates a corresponding timestamped event log entry. Timestamped event log entries might also be created by the switches 130a-130M. The control node 200 is configured to, via one or more communication links 150, collect such timestamped event log entries from the end-points 120a-120N and switches 130a-130M. Further details of the control node 200 will be disclosed below.

The embodiments disclosed herein relate to mechanisms for analyzing event based behavior of end-points 120a-120N in an industrial system 100a, 100b. In order to obtain such mechanisms there is provided a control node 200, a method performed by the control node 200, a computer program product comprising code, for example in the form of a computer program, that when run on a control node 200, causes the control node 200 to perform the method.

Figure 3:
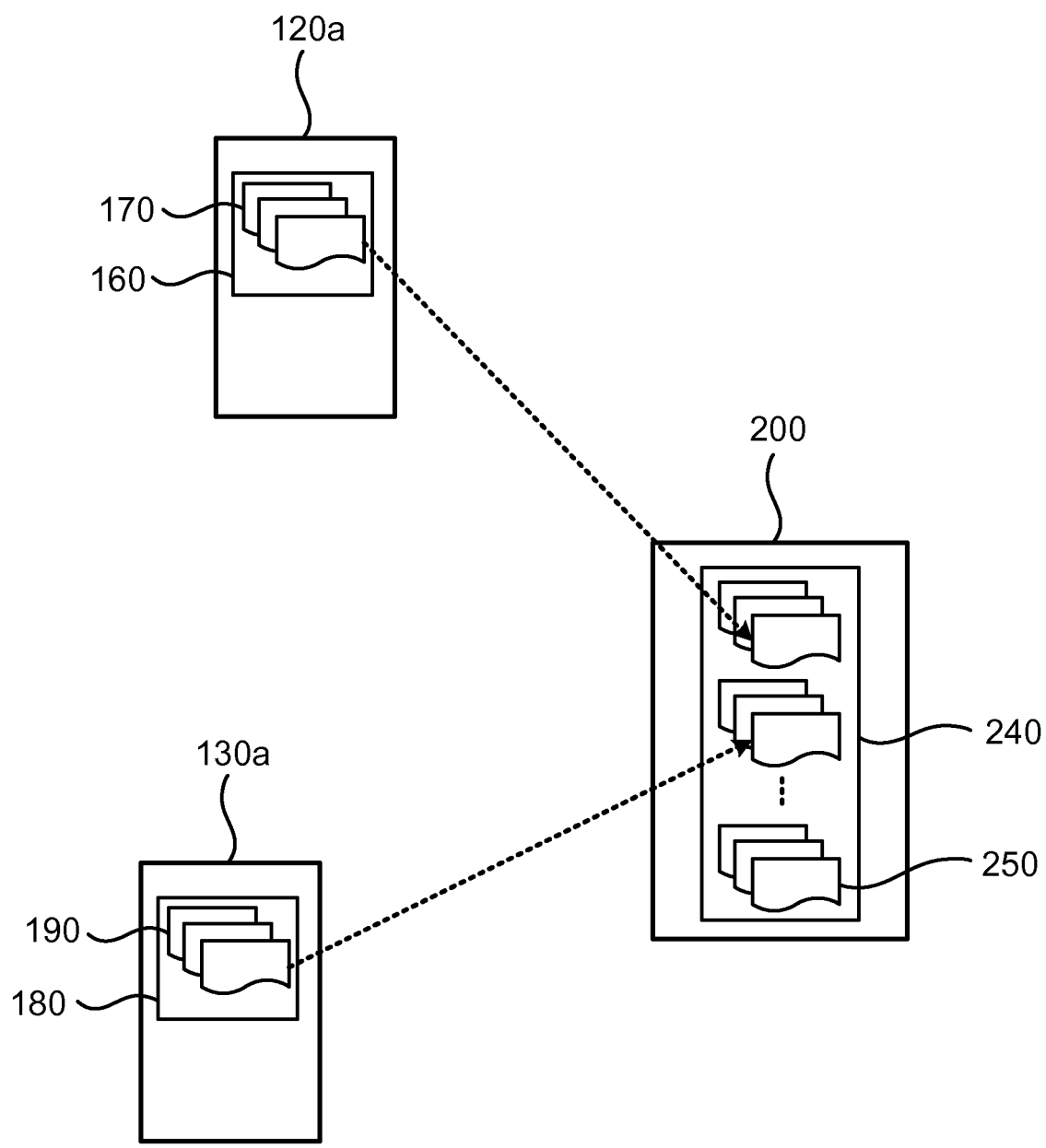
FIG. 3 is a schematic diagram illustrating an end-point, a switch, and a control node according to embodiments.

FIG. 3 is a schematic diagram illustrating one of the end-points 120a, one of the switches 130a, and the control node 200. As schematically illustrated, the end-point 120a holds an event log 160 that comprises timestamped event log entries 170. As also schematically illustrated, the switch 130a holds an event log 180 that comprises timestamped event log entries 190. The timestamped event log entries 170, 190 are transferred to data storage 240 of the control node 200 which might also hold timestamped event log entries 250 collected from other end-points and/or switches in the industrial system 100a, 100b.

Figure 4:
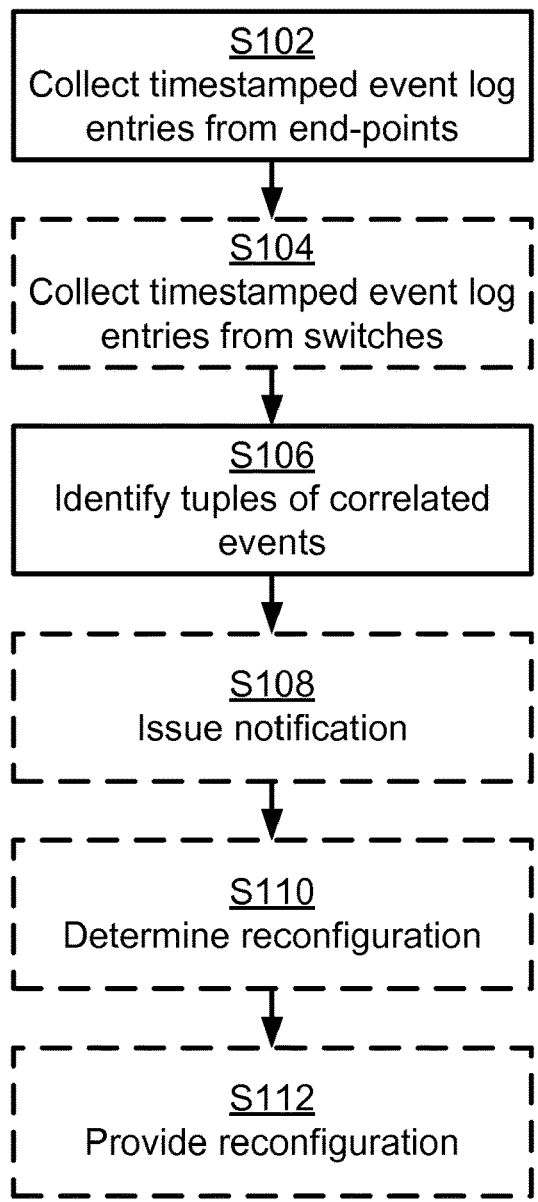
FIG. 4 is a flowchart of methods according to embodiments.

FIG. 4 is a flowchart illustrating embodiments of methods for analyzing event based behavior of end-points 120a-120N of a network 110 in an industrial system 100a, 100b. The methods are performed by the control node 200. The methods are advantageously carried out by a control node 200 executing one or more computer programs 620.

The embodiments disclosed herein are based on absolute time stamping information being added to event log entries in the end-points 120a-120N. The thus timestamped event log entries are provided from the end-points 120a-120N to the control node 200 once an event has been performed by one of the end-points 120a-120N. In some aspects the timestamped event log entries are provided from the end-points 120a-120N to the control node 200 by means of best effort traffic. Hence, the control node 200 is configured to perform step S102:

S102: The control node 200 collects, from the end-points 120a-120N, timestamped event log entries as created by the end-points 120a-120N within a time window. Each respective timestamped event log entry pertains to a respective event having been performed by one of the end-points 120a-120N.

The timestamped event log entries are transferred to the control node 200 for analysis. The use of timestamped event log entries from the end-points 120a-120N makes it possible to evaluate the whole end-to-end real-time data flow and not just the network part of the flow. Particularly, the control node 200 is configured to perform step S106:

S106: The control node 200 identifies tuples of correlated events by comparing the timestamped event log entries to each other. The control node 200 thereby provides a mapping between the events and those end-points 120a-120N where the events of each tuple of correlated events are performed.

The control node 200 thereby enables traceability of the events between those end-points where the events of each tuple of correlated events are performed. A method defined by steps S102 and S106 will reveal if events occurred in the end-points 120a-120N in the network 110. A method defined by steps S102 and S106 will reveal when (i.e., the specific points in time) events occur in the end-points 120a-120N in the network 110. A method defined by steps S102 and S106 will reveal how related (i.e., how correlated) events in multiple end-points 120a-120N are. In this respect, the method might further be used to determine the packet latency from end-point 120a-120N to end-point 120a-120N through the network 110, and/or the latency jitter from end-point 120a-120N to end-point 120a-120N through the network 110.

Embodiments relating to further details of analyzing event based behavior of end-points 120a-120N of a network 110 in an industrial system 100a, 100b as performed by the control node 200 will now be disclosed.

One timestamped event log entry is created by each end-point 120a-120N for each respective event the end-point 120a-120N performs. There may be different types of such events. According to non-limiting examples each of the events pertains to any of: creating a packet, modifying a packet, performing an action based on content of a packet, transmitting a packet, receiving a packet. That is, each time a packet is created, a corresponding event log entry could be created, where the event log entry is timestamped in accordance with the point in time when the packet was created. Thus, in general terms, the event log entry is timestamped in accordance with the point in time when the action that created the event was performed. Events could be created at any protocol layer in the Open Systems Interconnection (OSI) model.

According to an embodiment at least some of the events pertain to packets being transmitted through the network 110 from one of the end-points 120a-120N to another of the end-points 120a-120N. As an illustrative example a first timestamped event log entry could be created by a first end-point 120a when a packet is created by the first end-point 120a. A second timestamped event log entry could be created by the first end-point 120a when the same packet is transmitted by the first end-point 120a. A third timestamped event log entry could be created by a second end-point 120b when the same packet is received by the second end-point 120b. A fourth timestamped event log entry could be created by the second end-point 120b when an action based on the content of the same packet is performed by the second end-point 120b. One or more further timestamped event log entries could be created by one or more of the switches 130a-130M when the packet is routed through the network 110 between the first end-point 120a and the second end-point 120b, and so on. Since all these events are related to each other they thus form a tuple of correlated events which can be mapped between the first end-point 120a and the second end-point 120b, thus enabling these events to be traced between the first end-point 120a and the second end-point 120b.

There may be different types of time windows. According to an example the time window is a sliding time window. This allows all events within a certain time from each other (as given by the size of the sliding time window) to be compared to each other. According to another example the time window has a predetermined start point and a predetermined end point. This allows all events during a certain period of time to be compared to each other. For example, if each time window is 2 minutes long, there could be one time window starting at time 12:00:00 (in units hour:minutes:seconds) and ending at time 12:02:00, another time window starting at time 12:02:00 and ending at time 12:04:00, and so on. Yet alternatively the time windows are overlapping.

In addition to timestamped event log entries being created by the end-points 120a-120N, timestamped event log entries could also be created by entities, such as switches, gateways, routers, access points, network nodes, etc. in the network 110. Particularly, packets in the network 110 could be routed through the switches 130a-130M, and each switch 130a-130M could create a respective timestamped event log entry for each event it performs on the packets (as related to the packets being switched). Then also these timestamped event log entries could be considered by the control node 200 when identifying the tuples of correlated events in step S106. Particularly, according to an embodiment the control node 200 is configured to perform (optional) step S104:

S104: The control node 200 collects timestamped event log entries as created by the switches 130a-130M within the time window.

The identifying in step S106 is then further based on the timestamped event log entries collected from the switches 130a-130M.

As noted above, the control node 200 enables traceability of the events between those end-points where the events of each tuple of correlated events are performed. Further in this respect, In some aspects the timestamped event log entries give an indication of whether all processes involved when an event is performed in the end-points 120a-120N executes in time and in relation to the network communication mechanisms and associated configurations or not. Particularly, according to an embodiment the identifying in step S106 further comprises comparing observed network behavior, as defined by the timestamped event log entries, to a configured network behavior.

The timestamped event log entries could thus be used as an indicator of whether the configured network behavior is followed or not. In some aspects the control node 200 issues a notification when the configured network behavior is not followed. Particularly, according to an embodiment the control node 200 is configured to perform (optional) step S108:

S108: The control node 200 issues a notification if the observed network behavior deviates from the configured network behavior.

There could be different types of such notifications. The type of notification could be dependent on how much the observed network behavior deviates from the configured network behavior. For example, if the deviation is larger than a threshold (such as for example if the resulting packet delay is larger than a threshold delay value) an alarm might be issued. Otherwise only a log entry of the deviation might be created by the control node 200.

Having access to large amounts of timestamped event log entries, as well as resulting tuples of correlated events, from many, or even all, end-points 120a-120N in an industrial system 110a, 110b can shorten the time for artificial intelligence (AI) or machine learning (ML) based systems to generate/refine/correct network configurations and end-point configurations to achieve desired real-time behavior from both the network 110 as a whole and the individual end-points 120a-120N. An indication that the observed network behavior deviates from the configured network behavior could thus be used as a trigger that reconfiguration is needed. Particularly, according to an embodiment the control node 200 is configured to perform (optional) step S120:

S120: The control node 200 determines reconfiguration of any end-point 120a-120N or switch 130a-130M for which the observed network behavior deviates from the configured network behavior.

Further, once the reconfiguration has been determined, the reconfiguration should be provided to the end-point 120a-120N or switch 130a-130M. In some aspects the reconfiguration is provided to the end-point 120a-120N or switch 130a-130M by the control node 200 itself. Particularly, according to an embodiment the control node 200 is configured to perform (optional) step S112:

S112: The control node 200 provides the end-point 120a-120N or switch 130a-130M with the determined reconfiguration.

The thus affected end-point 120a-120N or switch 130a-130M might thus be configured to receive the determined reconfiguration in order to be reconfigured accordingly. How to reconfigure an end-point or switch is as such known in the art and further description thereof is therefore omitted.

Thereby, higher availability, lower latency/jitter communication can be achieved between all end-points 120a-120N in the network 110.

According to an embodiment the end-points 120a-120N are time synchronized with respect to each other. In this respect, the end-points 120a-120N might have a common clock source, have synchronized clocks, or operate according to a synchronized clock reference. This might further improve the comparison of the timestamped event log entries to each other when the tuples of correlated events are identified in step S106. According to a first example, without access to accurately synchronized end-points 120a-120N in the network 110 a common clock source could be operatively connected to each end-point 120a-120N in order for the end-points 120a-120N to be able to create time-synchronized timestamped event log entries. According to a second example, with for instance accurately IEEE 802.1AS-Rev synchronized end-points 120a-120N, time-synchronized timestamped event log entries can in each end-point 120a-120N be created based on the IEEE 802.1AS-Rev clock.

Figure 5:
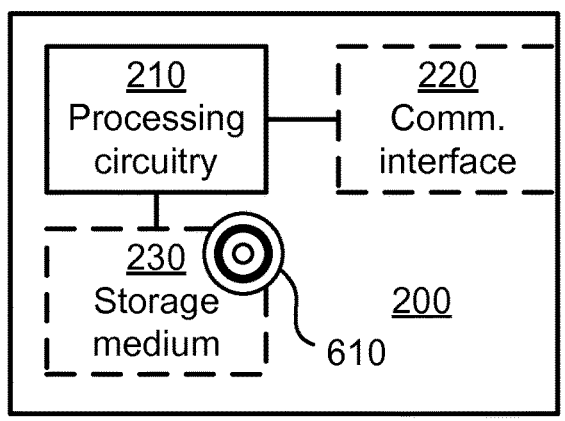
FIG. 5 is a schematic diagram showing functional units of a control node according to an embodiment.

FIG. 5 schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, or steps, as disclosed above. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. For example, the storage medium 230 could hold the data storage 240.

The control node 200 may further comprise a communications interface 220 at least configured for communications with other entities, functions, nodes, and devices of the network 110 via communication links 150. As such the communications interface 220 may comprise one or more transmitters and receivers, comprising analogue and digital components.

The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 6:
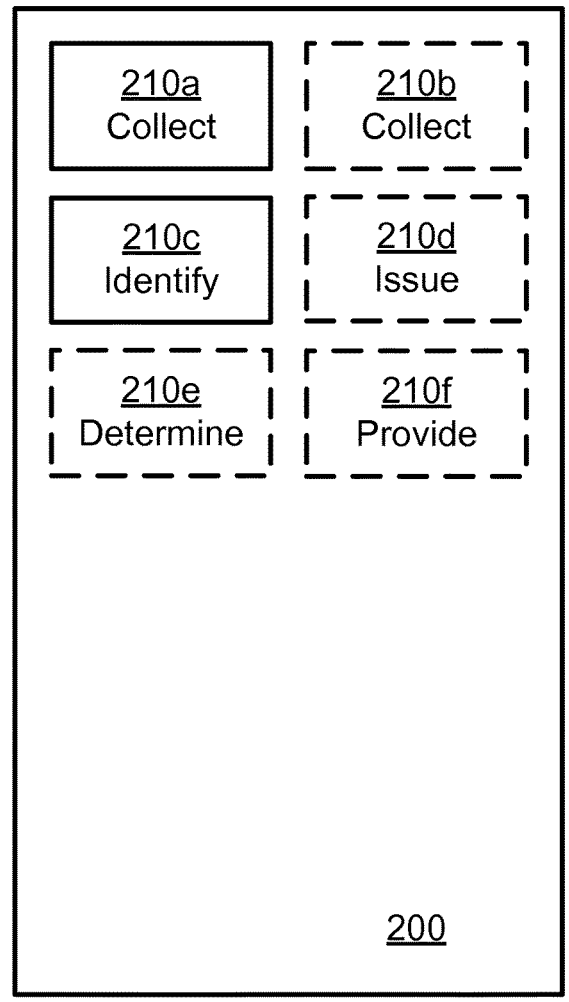
FIG. 6 is a schematic diagram showing functional modules of a control node according to an embodiment.

FIG. 6 schematically illustrates, in terms of a number of functional modules, the components of a control node 200 according to an embodiment. The control node 200 of FIG. 6 comprises a number of functional modules; a collect module 210a configured to perform step S102, and an identify module 210c configured to perform step S106. The control node 200 of FIG. 6 may further comprise a number of optional functional modules, such as any of a collect module 210b configured to perform step S104, an issue module 210d configured to perform step S108, a determine module 210e configured to perform step S110, and a provide module 210f configured to perform step S112, In general terms, each functional module 210a-210f may in one embodiment be implemented only in hardware and in another embodiment with the help of software, i.e., the latter embodiment having computer program instructions stored on the storage medium 230 which when run on the processing circuitry makes the control node 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The control node 200 may be provided as a standalone device or as a part of at least one further device. For example, the control node 200, or at least its functionality as herein disclosed, might be provided in a gateway 107 of an industrial system 100a, 100b configured for ABB ability services. Alternatively, functionality of the control node 200 may be distributed between at least two devices, or nodes. These at least two nodes, or devices, may either be part of the same network part or may be spread between at least two such network parts. As an example, a first part of the control node 200 having access to limited computational resources might be implemented on the premises of the industrial system 100a, 100b and perform only limited big-data analytics of timestamped event log entries, whilst a second part of the control node 200 having access to higher amounts of computational resource might be implemented in a computational cloud environment execute more unlimited big-data analytics of the timestamped event log entries. Thus, the first part of the control node 200 might act as a pre-processor for the second part of the control node 200, reducing the amount of data that has to be communicated to the second part of the control node 200. Further, the first part of the control node 200 might be configured by the second part of the control node 200. The first part of the control node 200 might be implemented to interface the second part of the control node 200 on one side and to interface a production, planning, and tracking system of the industrial system 100a, 100b and/or a control and operation system on another side.

Thus, a first portion of the instructions performed by the control node 200 may be executed in a first device (as defined by the first part of the control node 200), and a second portion of the of the instructions performed by the control node 200 may be executed in a second device (as defined by the second part of the control node 200); the herein disclosed embodiments are not limited to any particular number of devices on which the instructions performed by the control node 200 may be executed. Hence, the methods according to the herein disclosed embodiments are suitable to be performed by a control node 200 residing in a cloud computational environment 106. Therefore, although a single processing circuitry 210 is illustrated in FIG. 5 the processing circuitry 210 may be distributed among a plurality of devices, or nodes. The same applies to the functional modules 210a-210f of FIG. 6 and the computer program 620 of FIG. 7 (see below).

Figure 7:
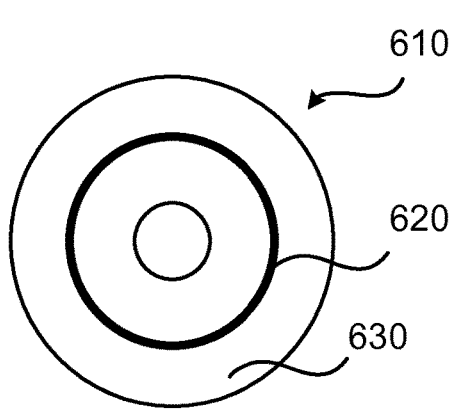
FIG. 7 shows one example of a computer program product comprising computer readable storage medium according to an embodiment.

FIG. 7 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 7, the computer program product 610 is illustrated as an optical disc, such as a CD (compact disc) or a DVD (digital versatile disc) or a Blu-Ray disc. The computer program product 610 could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for analyzing event based behavior of end-points of a Time-Sensitive Network, TSN, in an industrial system, wherein the end-points are configured for operation in the TSN, and wherein the end-points are time synchronized with respect to each other, the method being performed by a control node, the method comprising:
collecting, from the end-points, timestamped event log entries as created by the end-points within a time window, wherein each respective timestamped event log entry pertains to a respective event performed by one of the end-points; and
identifying tuples of correlated events by comparing the timestamped event log entries to each other, thereby providing a mapping between the events and those end-points where the events of each tuple of correlated events are performed, wherein the identifying further comprises comparing observed network behavior, as defined by the timestamped event log entries, to a configured network behavior;
wherein each of the events pertains to any of: creating a packet, modifying a packet, performing an action based on content of a packet, transmitting a packet, receiving a packet.

2. The method according to claim 1, wherein packets in the network are routed through switches, wherein each switch creates a respective timestamped event log entry for each event it performs on the packets, the method further comprising:
collecting timestamped event log entries as created by the switches within the time window,
wherein the identifying further is based on the timestamped event log entries collected from the switches.

3. The method according to claim 1, further comprising:
issuing a notification if the observed network behavior deviates from the configured network behavior.

4. The method according to claim 3, further comprising:
determining reconfiguration of any end-point or switch for which the observed network behavior deviates from the configured network behavior; and
providing said any end-point or switch with the determined reconfiguration.

5. The method according to claim 1, wherein at least some of the events pertain to packets being transmitted through the network from one of the end-points to another of the end-points.

6. The method according to claim 1, wherein the time window is a sliding time window.

7. The method according to claim 1, wherein the end-points are part of a networked embedded system.

8. The method according to claim 1, wherein the end-points are pieces of industrial plant equipment.

9. A control node for analyzing event based behavior of end-points of a Time-Sensitive Network, TSN, in an industrial system, wherein the end-points are configured for operation in the TSN, and wherein the end-points are time synchronized with respect to each other, the control node comprising processing circuitry, the processing circuitry being configured to cause the control node to:
  collect, from the end-points, timestamped event log entries as created by the end-points within a time window, wherein each respective timestamped event log entry pertains to a respective event performed by one of the end-points; and
  identify tuples of correlated events by comparing the timestamped event log entries to each other, thereby providing a mapping between the events and those end-points where the events of each tuple of correlated events are performed, wherein the identify further comprises comparing observed network behavior, as defined by the timestamped event log entries, to a configured network behavior;
  wherein each of the events pertains to any of: creating a packet, modifying a packet, performing an action based on content of a packet, transmitting a packet, receiving a packet.

10. The control node according to claim 9, further being configured to perform a method including the steps of: collecting timestamped event log entries as created by the switches within the time window,
  wherein the identifying further is based on the timestamped event log entries collected from the switches.

11. An industrial system for analyzing event based behavior of end-points of a Time-Sensitive Network, TSN, in the industrial system, wherein the end-points are configured for operation in the TSN, and wherein the end-points are time synchronized with respect to each other, the industrial system comprising:
  a control node having processing circuitry, the processing circuitry being configured to cause the control node to:
    collect timestamped event log entries as created by the end-points within a time window, wherein each respective timestamped event log entry pertains to a respective event performed by one of the end-points; and
    identify tuples of correlated events by comparing the timestamped event log entries to each other, thereby providing a mapping between the events and those end-points where the events of each tuple of correlated events are performed, wherein the identify further comprises comparing observed network behavior, as defined by the timestamped event log entries, to a configured network behavior;
    wherein each of the events pertains to any of: creating a packet, modifying a packet, performing an action based on content of a packet, transmitting a packet, receiving a packet; and
  at least one of the end-points, configured to:
    create at least one of the timestamped event log entries; and
    provide said at least one of the timestamped event log entries to the control node.

12. The industrial system according to claim 11, wherein:
  the control node is further configured to provide the at least one end-point with a determined reconfiguration when observed network behavior of the at least one of the end-points deviates from configured network behavior for the at least one of the end-points; and
  the at least one of the end-points is further configured to receive the determined reconfiguration in order to be reconfigured accordingly.

13. A computer program for analyzing event based behavior of end-points of a Time-Sensitive Network, TSN, in an industrial system, wherein the end-points are configured for operation in the TSN, and wherein the end-points are time synchronized with respect to each other, the computer program comprising computer code which, when run on processing circuitry of a control node, causes the control node to:
  collect, from the end-points, timestamped event log entries as created by the end-points within a time window, wherein each respective timestamped event log entry pertains to a respective event performed by one of the end-points; and
  identify tuples of correlated events by comparing the timestamped event log entries to each other, thereby providing a mapping between the events and those end-points where the events of each tuple of correlated events are performed, wherein the identify further comprises comparing observed network behavior, as defined by the timestamped event log entries, to a configured network behavior;
  wherein each of the events pertains to any of: creating a packet, modifying a packet, performing an action based on content of a packet, transmitting a packet, receiving a packet.

14. A computer program product comprising a computer program for analyzing event based behavior of end-points of a Time-Sensitive Network, TSN, in an industrial system, wherein the end-points are configured for operation in the TSN, and wherein the end-points are time synchronized with respect to each other, the computer program comprising computer code which, when run on processing circuitry of a control node, causes the control node to:
  collect, from the end-points, timestamped event log entries as created by the end-points within a time window, wherein each respective timestamped event log entry pertains to a respective event performed by one of the end-points;
  identify tuples of correlated events by comparing the timestamped event log entries to each other, thereby providing a mapping between the events and those end-points where the events of each tuple of correlated events are performed, wherein the identify further comprises comparing observed network behavior, as defined by the timestamped event log entries, to a configured network behavior;
  wherein each of the events pertains to any of: creating a packet, modifying a packet, performing an action based on content of a packet, transmitting a packet, receiving a packet; and
  a computer readable storage medium on which the computer program is stored.

* * * * *